United States Patent [19]

Gerhart et al.

[11] Patent Number: 4,462,257
[45] Date of Patent: Jul. 31, 1984

[54] STRAIN SENSITIVE ULTRASONIC SURFACE WAVE DETECTOR

[75] Inventors: Grant R. Gerhart, Oakland; Douglas N. Rose, Macomb, both of Mich.

[73] Assignee: The United States of America as represented by the Secretary of the Army, Washington, D.C.

[21] Appl. No.: 426,523

[22] Filed: Sep. 29, 1982

[51] Int. Cl.³ .......................... G01B 7/18; G01B 17/04
[52] U.S. Cl. ........................................ 73/644; 73/774; 73/775
[58] Field of Search ................... 33/1 P; 73/649, 777, 73/774, 775, 776; 338/2

[56] References Cited

U.S. PATENT DOCUMENTS

| 2,837,619 | 6/1958 | Stein et al. | 338/2 |
| 3,758,830 | 9/1973 | Jackson et al. | 73/777 |
| 4,255,974 | 3/1981 | Dufrane et al. | 73/776 |

FOREIGN PATENT DOCUMENTS 921837  3/1963  United Kingdom ................. 73/774

Primary Examiner—Gerald Goldberg
Assistant Examiner—Anna M. Schrichte
Attorney, Agent, or Firm—Peter A. Taucher; John E. McRae; Robert P. Gibson

[57] ABSTRACT

A novel transducer able to detect ultrasonic surface waves over a wide frequency band. The transducer is essentially a grid or series of bars connected in parallel or series. The sensitivity of the transducer increases proportionally with frequency for constant surface wave amplitude. The transducer detects surface waves by providing a resistance change across the transducer output terminal proportional to the surface wave strain. The output voltage can be calibrated to give a direct reading of the surface wave amplitude. The coupling problems which are inherent in most transducer configurations are drastically reduced for this strain sensitive detector. The modulation of the grid excitation voltage provides a means for mixing two signals by giving the direct product of the signals in time. Complicated filtering functions can be built into the grid detector by varying the bar spacing in a manner analogous to the piezoelectric interdigital grid transducer. The novel transducer hereof also lends itself to performing a novel method of detecting ultrasonic surface waves, i.e., particularly Rayleigh waves.

8 Claims, 8 Drawing Figures

STRAIN SENSITIVE ULTRASONIC SURFACE WAVE DETECTOR

GOVERNMENT INTEREST

The invention described herein may be manufactured, used, and licensed by or for the Government for governmental purposes without payment to use of any royalty thereon.

SUMMARY OF THE INVENTION

Our invention relates to the generation and subsequent detection of ultrasonic surface waves in a test specimen for nondestructively determining certain physical properties of the specimen material. Such waves have short wavelengths generally less than 0.005M; they are confined to the surface of the specimen, i.e., to a depth less than 0.001M. A special case of these surface waves is sometimes termed Rayleigh waves. In accordance with our invention, a strain-electrical transducer is adhered to the specimen surface to sense or detect a surface wave generated in the specimen; an electrical output related to the wave characteristic is produced. The general purpose of the invention is to detect ultrasonic surface waves by measuring either an AC or DC voltage drop across the transducer terminals. The presence of the surface wave induces a strain in the transducer which changes its electrical impedance. The frequency and amplitude of the wave determine the frequency and amplitude of the transducer output voltage. The measurement of these parameters gives the velocity and attenuation of the surface wave in the specimen. This information can be used to determine the mechanical and structural properties of a material near the specimen surface, as follows:

a. Measure residual stress concentrations and determine whether these stresses are compressive or tensile stresses.

b. Measure the elastic constants of the specimen material.

c. Determine the grain size and homogeneity of polycrystalline metal alloys.

d. Determine the position and size of surface and subsurface flaws in the specimen material.

Prior methods for detecting ultrasonic surface waves include the use of piezoelectric crystals, interdigital grid transducers, and electromagnetic detection methods. Several of the prior transducers can only detect ultrasonic surface waves on special materials. For example, interdigital grid transducers can only generate and detect surface waves on piezoelectric materials. The electromagnetic generation and detection of surface waves is restricted to metals. The piezoelectric transducers are generally quite expensive in comparison to our proposed transducers. In addition, several of the prior methods are more sensitive to coupling variations between the transducer and the sample under applied external stress.

The transducer described here is able to detect an ultrasonic Rayleigh wave over a wide frequency band. The transducer sensitivity increases proportionally with frequency for a constant amplitude surface wave displacement. This characteristic is important since the generation of large amplitude surface waves becomes increasingly more difficult at higher frequencies. Applied AC and DC external stresses can be simultaneously measured with this invention. Coupling variations between the transducer and the sample are reduced to a minimum and can be compensated in the presence of an externally applied stress. The simplicity of the invention suggests that its price could be considerably less than prior transducers. This aspect would lead to inexpensive transducers, which could be disposed of at the end of a particular test or experiment.

THE DRAWINGS

Figure 1:
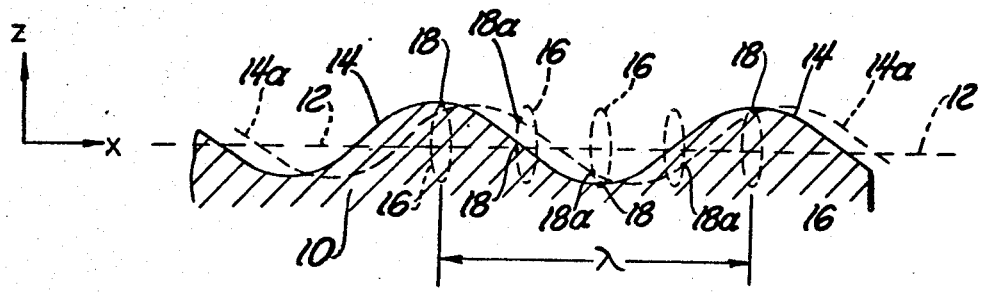
FIGS. 1 and 2 illustrate changes in surface contour experienced by a specimen when subjected to Rayleigh waves.

FIG. 1 shows a specimen of solid material 10 having a normally flat surface depicted by dotted line 12. When a harmonic surface wave, such as a Rayleigh wave, is induced in the specimen the surface assumes a wavelike character as depicted by line 14. In a typical case, the wavelength would be on the order of 0.3 mm for a 10 MHz Rayleigh wave on Aluminum. As the wave proceeds from left to right individual particles on the specimen surface undergo clockwise elliptical motion as depicted by particle pathlines 16. Numerals 18 represent the positions of representative particles at the illustrated condition of the specimen surface. Dotted line 14a represents the wave at a later point in time of its advancement along the specimen surface. Each surface particle is displaced slightly along pathlines 16 to new positions 18a. Since the individual particles are moving in different directions at any one instant, depending upon their relative phase, there will be a cyclic contraction-expansion movement of the specimen surface as the wave passes.

Designate longitudinal wave motion as being in the X direction, and transverse wave motion as being in the Z direction which is perpendicular to the surface. The remaining orthogonal direction (normal to the plane of the paper in FIG. 1) may be designated as the Y direction. The longitudinal and transverse components of wave displacement in an isotropic, homogenous specimen 10 are then given by:

$$D_x = A\sin(K_x - \omega t) \quad (1a)$$

$$D_z = B\cos(K_x - \omega t)$$

$$A = CK\left[e^{-qz} - \frac{2qs}{K^2 + s^2}e^{-sz}\right]$$

$$B = Cq\left[e^{-qz} - \frac{2K^2}{K^2 + s^2}e^{-sz}\right]$$

$$q^2 = K^2 - K_l^2$$

$$s^2 = K^2 - K_t^2$$

$$C = \text{Constant}$$

In the above equations A and B are wave amplitude constants; K, q and s are wave propagation vectors, and $D_x$ and $D_z$ are respectively the longitudinal and transverse displacement components along the x and z axes of a wave propagating along the x-axis. The quantities K, $K_t$ and $K_l$ are respectively the magnitudes of the wave-vectors for the Rayleigh, transverse and longitudinal waves. Evaluating A and B at the surface of the solid (z=0) gives $$A = CK\left[1 - \frac{2qs}{K^2 + s^2}\right] \quad (1b)$$

$$B = Cq\left[1 - \frac{2K^2}{K^2 + s^2}\right]$$

The particle motion defined by the $D_x$ and $D_z$ components in Eq. 1a is elliptical. The two components are 90° out of phase and their amplitudes unequal. The presence of a wave with an infinitesimal amplitude distorts the surface from its normally flat shape in the unstressed state. This distortion is a tension or compression in the X-Z plane depending upon the phase of the wave. The strain components at a point in the transducer are calculated by differentiating the $D_x$ and $D_z$ displacement components in Eq. 1a. The strain components associated with a wave propagating along the X-axis on the surface (z=0) of an infinite half-space are given in Eq. 2.

$$\epsilon_{xx} = \frac{\partial D_x}{\partial x} = K^2C[1 - \{2qs/(K^2 + s^2)\}]\cos(K_x - \omega t) \quad (2)$$

$$\epsilon_{zz} = \frac{\partial D_z}{\partial z} = -Cq[q - \{2K^2s/(K^2 + s^2)\}]\cos(K_x - \omega t)$$

$$\epsilon_{xz} = \epsilon_{xy} = \epsilon_{yz} = \epsilon_{yy} = 0$$

Figure 2:
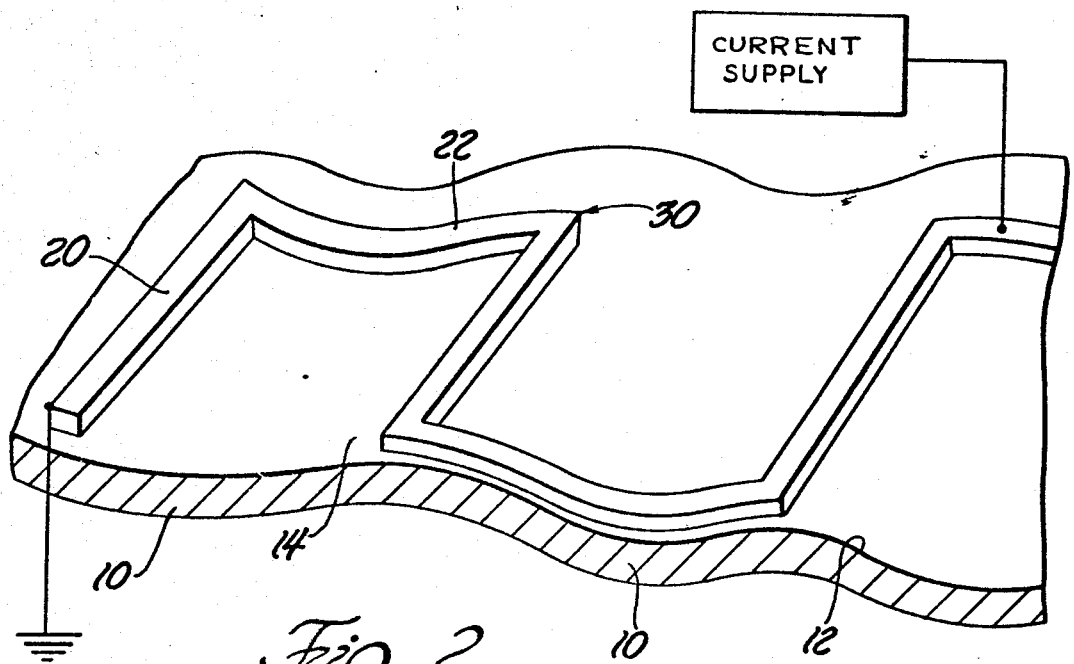

FIG. 2 is a perspective view illustrating the exaggerated effect of the surface wave on a grid-like transducer constructed according to our invention. Those learned in the art will appreciate that only infinitesimal changes actually occur. The transducer comprises at least one electrically conductive bar 20 rigidly affixed or adhered to specimen surface 12. FIG. 2 shows three bars 20 connected between a current supply and ground to provide a variable impedance wave sensor or detector. Bars 20 are oriented on the specimen normal to the general direction of the wave so that wave action produces slight but measurable changes in the bar cross-sectional shape and electrical impedance. At their ends, the bars are connected to each other by an electrical connector 22. The individual bars of the grid may be connected in a parallel or series arrangement to adjust the grid impedance characteristics for proper impedance matching with suitable amplifier circuitry. FIG. 2 shows a series arrangement with each grid bar 20 interconnected by segment 22.

Figure 3:
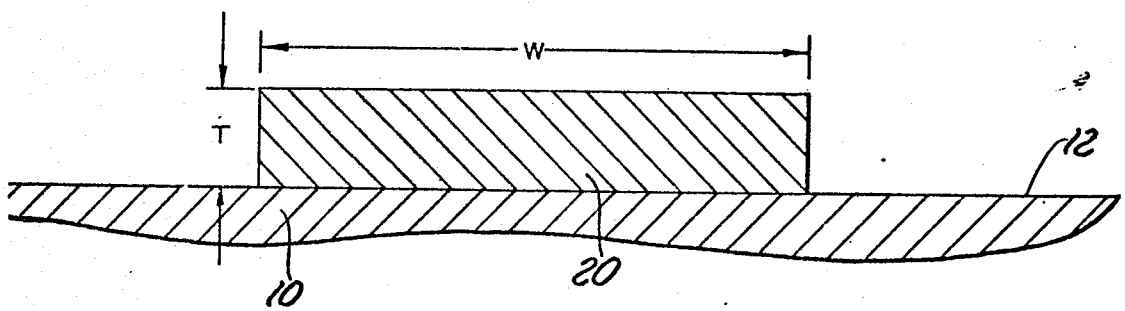
FIGS. 3 through 5 illustrate changes in the cross sectional area of the transducer bar.

Bars 20 are shown in FIG. 2 to be spaced apart by one wavelength distance so that each bar will be subject to the same strain at any one instant; this insures that all of the impedance changes are in phase. The bars can be spaced apart by an integer multiple number of wavelengths. The width dimension W as seen in FIG. 3 of each bar 20 is preferably much smaller than the surface wave wavelength so that all of an individual bar will be in phase relative to a compression or tension, at any one instant. The bar width dimension W should be no more than one tenth of the surface wavelength. The bar thickness dimension T is preferably made as small as possible, consistent with manufacturing technology, fragility considerations during handling, and mechanical strength when adhered to the specimen and subjected to surface wave forces. The bar should be very thin so that the incident surface wave does not see a significant mechanical impedance change.

Figure 4:
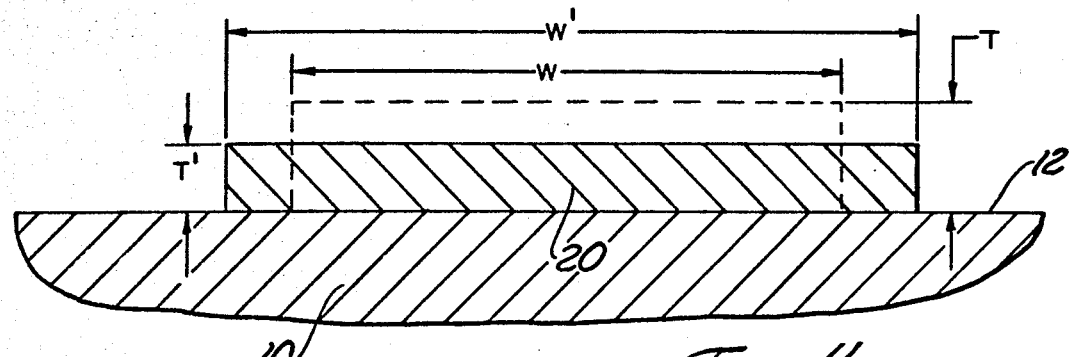
Figure 5:
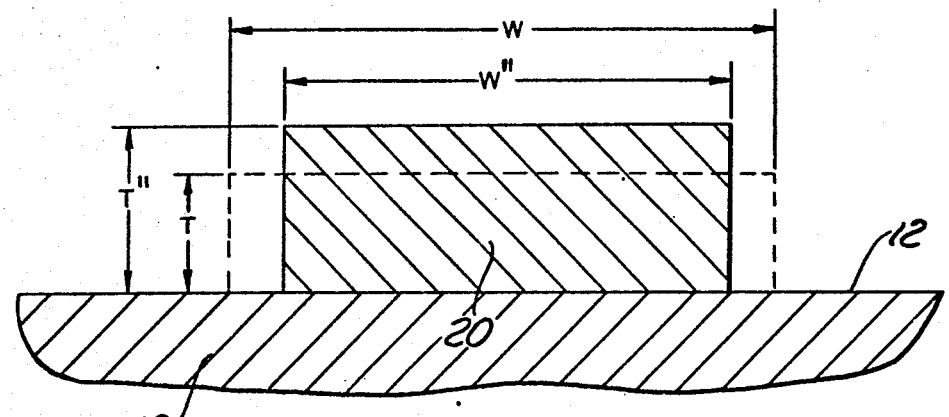

FIGS. 3 through 5 depict the series of events which occur as the ultrasonic surface wave strikes the grid bar. FIG. 3 is a cross-sectional illustration of one grid bar before interaction with a surface wave. Note that the width dimension 'W' is much greater than the thickness 'T' dimension. The surface 12 is depicted as essentially flat as far as its interaction with the grid bar is concerned, however, there is a slight curvature imparted to the surface 12 by the advancing wavefront. This will be described in greater detail later. FIG. 4 depicts the condition of the bar at a peak longitudinal tensile strain. Note that the dotted line depicts the original condition of the bar and the solid line depicts its deformed state. The bar is compressed in the thickness direcion so that T' is less than T and stretched in the width direction such that W' is greater than W. FIG. 5 shows the distortion the bar experiences when the longitudinal strain is a minimum. Width is compressed so that W'' is less than W and T'' is greater than T. These changes are caused by the strain distribution of the surface wave. Examining this phenomena in greater detail; for a bar that is small compared to the surface wave wavelength, the change in length of the bar is given by $$dL/L = \epsilon_{yy} \quad (3)$$

The strain component $\epsilon_{yy}$ is zero for a Rayleigh wave propagating as shown in FIGS. 1 and 2 so that there is no change in the length of the bar. However there is a change in the cross-sectional area A of the bar.

The change in cross-sectional area of the bar is given by $$dA/A = \epsilon_{xx} + \epsilon_{zz} \quad (4)$$

again taking the case of a bar that is small compared to the surface wave wavelength. Substituting the expressions for $\epsilon_{xx}$ and $\epsilon_{zz}$ at the surface (i.e., z=0), and reducing since $K^2 - q^2 = K^2_l$ gives $$dA/A = Ck_l^2 \cos(K_x - wt) \quad (5)$$

where C is as before and K, and $K_l$ are respectively the magnitudes of the Rayleigh and longitudinal wave vectors.

This change in the cross-sectional area of the bar causes a change in the resistance of the bar. Let R be the resistance of a single grid bar, then $$R = \rho L/A \quad (6)$$

where $\rho$, L and A are respectively the resistivity, length and the cross-sectional area of the bar. A differential change in R is related to dL and dA by $$dR/R = dL/L - dA/A \quad (7)$$

Since dL/L=0 for this case, $$dR/R = -dA/A \quad (8)$$

and thus, substituting for dA/A, $$dR/R = -Ck_l^2 \cos(K_x - wt) \quad (9)$$

For measuring this resistance change, take the case where a constant current is forced through the bar, then the voltage change across the bar is given by $$dV/V = dR/R \quad (10)$$

$$dR/R = -Ck_l^2 \cos(k_x - wt) \quad (11)$$

Remembering that $K_l^2 = W^2/V_l^2$, where $V_l$ is the longitudinal wave velocity, and comparing the above expression with equations 1a and 1b which describe the amplitude of the SW, there is an additional factor of $\omega$ in the expression for dV/V above. Thus, given a constant surface wave amplitude, the sensitivity of this gate (dV/V) is proportional to frequency as long as the bar is small compared to the surface wave's wavelength. This is a distinct advantage since the sensitivity of the present transducers decreases with frequency. For a 10 MHz Rayleigh wave with a 0.10 nm transverse amplitude in aluminum which has the following velocities for the longitudinal, shear, and Rayleigh waves respectively, $$V_l = 6.35 \times 10^3 \text{ m/sec}$$

$$V_t = 3.10 \times 10^3 \text{ m/sec}$$

$$V_R = 2.9 \times 10^3 \text{ m/sec}$$

$$dV/V = 6.53 \times 10^{-5}$$

If the voltage across the gage is 10 volts, the detected AC voltage amplitude $\Delta v$ would be about 178 mv. As can be seen from the calculations, the strain of the surface wave changes the cross-sectional area of the grid bar which changes its DC resistance. Thus the mechanical surface wave's strain field is converted to an electrical parameter change which can be detected by the transducer.

Returning to the action of the individual bars as depicted in FIGS. 3 through 5, as the wave travels left to right on the specimen surface, the firmly adhered bar 20 changes from the normal condition shown in FIG. 3 where W is the width dimension and T is the thickness dimension, to the distorted conditions shown in FIGS. 4 and 5. As previously mentioned those learned in the art will understand that because the change in the width dimension of the bar 20 is small compared to the wavelength of the surface wave, the curvature of the bar and surface is negligible to first order. As the ultrasonic wave crest passes through the grid bar, as seen in FIG. 4, the thickness dimension of the bar is compressed so that T' is less than T and the width dimension is stretched such that W is greater than W'. The dotted line depicts the bar in its normal state.

As the trough portion of the wave passes through the bar as seen in FIG. 5, the width dimension is compressed such that W" is less than W and stretched in the thickness dimension such that T" is greater than T. Thus, as bar 20 width changes, the dimension T also changes. The electrical impedance of the bar is altered in a fashion somewhat analogous to a flow resistance change in a hydraulic system due to cross-sectional shape change and change in hydraulic radius. The changes in the configuration of the FIG. 3 bar are therefore transverse as well as longitudinal. The cross-sectional area is important in view of equations 4, 6, 7 and 8. It is the infinitesimal changes in the cross-sectional area of the grid bar 20 which causes the voltage chan dV/V.

Figure 6:
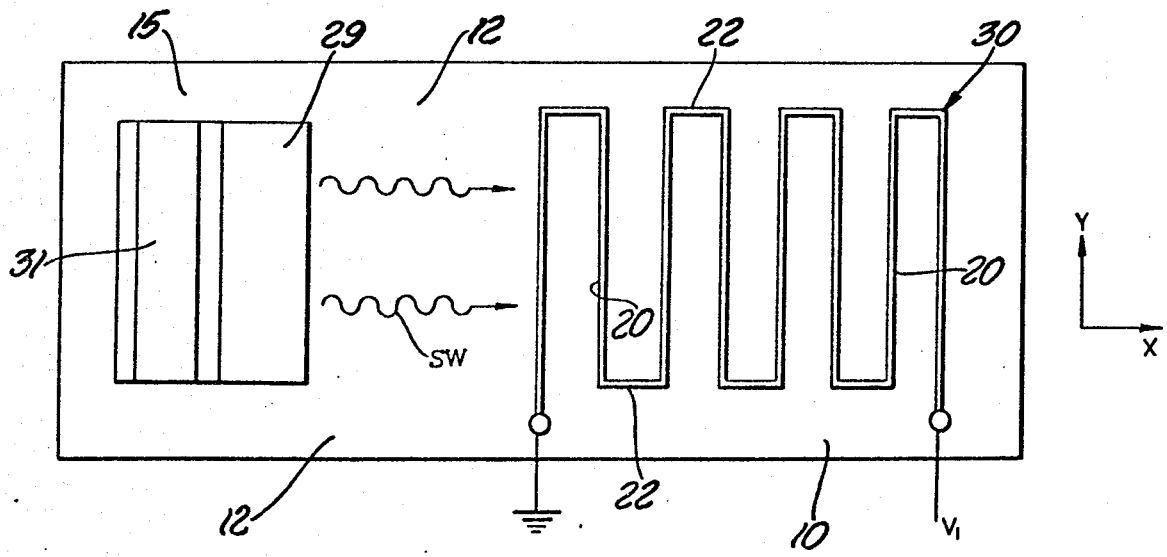
FIGS. 6 and 7 are top plane and side elevational views of a test system embodying our invention.
Figure 7:
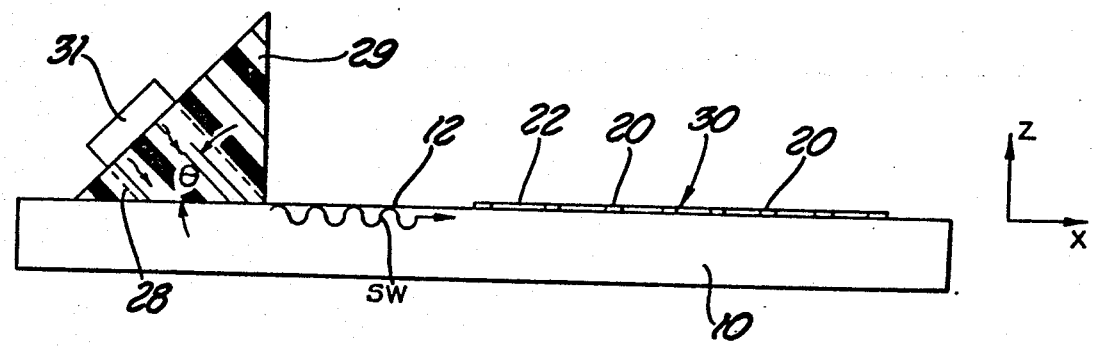

Various known mechanisms can be used to initi generate the surface waves in specimen 10, e.g., pi electric crystals, interdigital grid transducers, and m neto-acoustic generators. FIGS. 6 and 7 show a surf wave generator 28 that includes a plastic prism 29. hered to the sloping surface of the prism is a piezoe tric crystal 31. Electrical excitation of the crystal ge ates a plane longitudinal wave to propagate through prism. The longitudinal wave is incident onto the sp men surface 12 at an angle $\theta$. The angle $\theta$ is selecte meet the criterion that the longitudinal wave be fracted so that a surface wave is produced paralle the substrate surface.

$$\sin \theta = V_l/V_R$$

where $V_l$ is the longitudinal wave velocity in the pr material, and $V_R$ is the Rayleigh wave velocity in specimen material. The Rayleigh wave travels along specimen surface 12 toward transducer 30, which cludes spaced grid bars 20 and connector elements 2 previously described. Note that the wave is travelin the X-Z plane. The spacing between wave generato and transducer 30 is not critical, although some un sired attenuation of the wave signal occurs at very l spacings.

Figure 8:
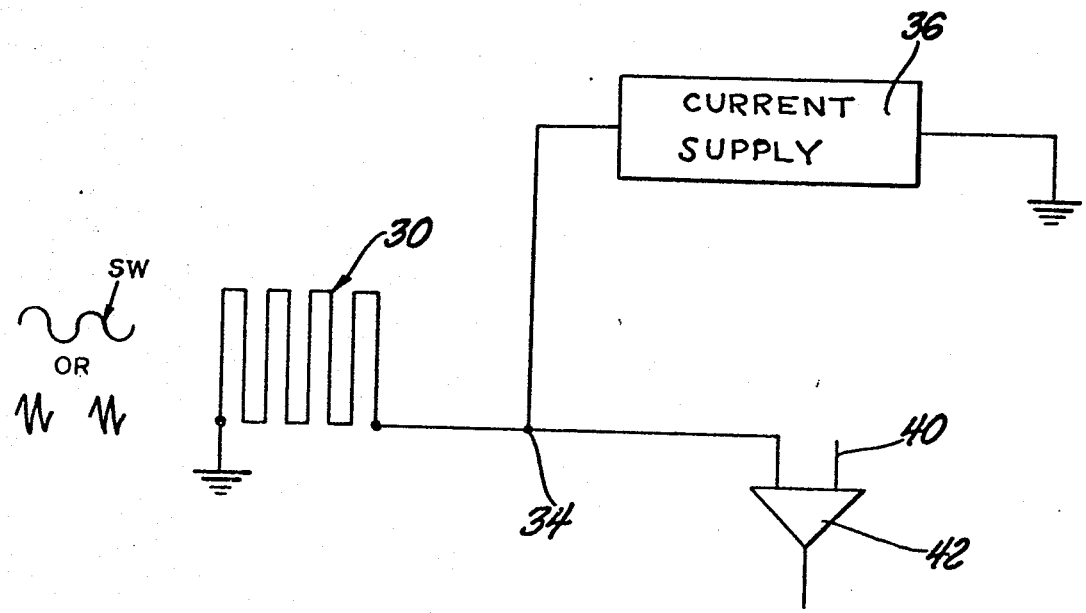
FIG. 8 shows an electric circuit usable with a transducer forming part of the FIG. 6 system.

FIG. 8 illustrates a rudimentary circuit correspo ing to the conditions of the sample calculation that be used to extract information from transducer 30. electrical current supply 36 forces a current through transducer 30. A voltage is produced at junction 34 t varies proportionally to the resistance of the transdu 30. Junction 34 voltage is applied to an amplifier Note that either a continuous or pulsed wave may utilized.

Transducer 30 can be used to measure the degre homogeneity of the specimen. Inhomogeneities p duce wave scattering and attenuation that are detec as smaller intensity waves at the transducer and lo voltage variations at junction 34. Residual stress c centrations in the specimen also cause variations in amplitude of the surface wave that can be measured transducer 30 and associated electrical devices.

The transducer is relatively simple in construct and can be disposable. The output voltage can be c brated to give a direct reading of the surface w amplitude. The sensitivity of the device increases p portionally with the product of wave frequency amplitude. This is advantageous since most wave det tors have a decreasing output with an increase in f quency. The transducer can measure simultaneou both the external static strains and the time vary strain induced by the surface wave. This is particula straight forward if the static strain is parallel to length of the grid bars. The coupling problems betwe the substrate and the ultrasonic detector which inherent in most transducer configurations are reduc for this strain sensitive detector. A modulation of excitation voltage for the surface wave generator p vides a means for mixing two signals, one from supply current and one from the incident surface wa giving the direct product of the voltages in time. Co plicated filtering functions can be built into the detec by varying the bar 20 spacing in a manner analogous the piezoelectric surface acoustic wave (SAW) filter Transducer 30 may be constructed of metal evaporated onto the specimen surface through a mask, or of metal that is evaporated or sputtered onto a substrate and then etched on the specimen using photolithographic techniques. Transducer 30 can also be constructed by filling in machined or laser scribed grooves in the specimen, using a material that is considerably more conductive than the substrate. Additionally, the grid can be formed by a grid-shaped ion-implanted conducting channel.

Good mechanical coupling is required between the transducer and specimen. The material for the transducer does not have to be a metal; however, if the conductivity of the transducer material is comparable to or less than that of the specimen, an electrically insulating layer would be required between the specimen and transducer grid. The insulating layer in this case would have to be chosen so that a good mechanical coupling is still maintained between the grid and the specimen. Mylar is one such insulating layer.

The thickness of each grid 20 is chosen to provide a usable grid resistance range. The usable range of bar thickness is limited by fabrication technology, the requirement for a good mechanical connection between the bar and specimen, and a requirement for good mechanical impedance matching between the grid bar and specimen.

The drawings show a multibar transducer 30 wherein the individual bars 20 are electrically interconnected in a series relationship. It is also possible to provide a transducer structure wherein the individual bars are electrically interconnected in parallel. With a parallel arrangement the overall transducer resistance would be lower for given grid bar dimensions and resistivity than with the series arrangement. A combination series-parallel arrangement could be used for intermediate transducer resistances. It should be noted that this transducer is not limited to the linear configuration as seen in these figures. For example, if a curved grid was utilized, the same equations and factors apply to such a transducer as described for the conventionally shaped grid transducer except that the curved grid is to correspond to a curved surface wave wavefront. Also the curved grid bars may be nonuniformly spaced to provide a time domain filter analogous to what is done with interdigital grid transducers, as could straight bars.

Also, it should be noted that this SW gage can also be used to detect static or slowly varying strains; however, there are other considerations if this is done. The gage is still sensitive to strains through changes in the length and cross-sectional area of the individual bars. The SW developmental framework however becomes inappropriate as the SW wavelength approaches the size of the object under examination. Indeed, the sensitivity of the gage as defined earlier approaches zero as the SW frequency approaches zero. Thus, for static and slowly varying strains this gage may be used in place of the strain gages in common use today. Concerns for reflection of the SW by mechanical impedance changes disappear. There is also no need to be concerned with grid bar spacing being a multiple of the SW wavelength.

It is also possible to use different gauge excitation signals in order to detect the Rayleigh wave signal. The power source used to create the gauge excitation signal may be either sinusoidal, such as an AC current, continuous, such as a DC current, a complex excitation time current or a pulsed input current. Each of these would have its own special application. For example, a DC current excitation signal could be used when it is necessary to apply continuous excitation signal to the transducer in order to obtain meaningful data from a continuous Rayleigh wave signal. An AC current excitation signal allows the experimenter to heterodyne the Rayleigh wave signal. A complex time varying excitation signal allows either AM or FM modulation of the Rayleigh wave signal. Finally, a pulsed input excitation signal is used to conform the application of the excitation to a pulsed Rayleigh wave signal. There are several advantages in using such a pulsed excitation signal. One such advantage is that an excitation signal is applied to the transducer only when a Rayleigh wave signal is present, thereby reducing any heating of the transducer caused by the presence of the pulsed excitation signal to a minimum. Thus, when the pulsed excitation signal is applied it can be of higher peak voltage than for example a continuous DC or AC excitation because the average excitation would remain low. Thus, gauge output signal could be greater than if a DC or continuous AC signal were applied.

Those skilled in the art will appreciate that although the present invention may be used in many of the same applications as a strain gage, the present invention differs from common state of the art strain gages in that it is customary to employ the usual strain gages with their long dimension parallel to the strain field. The present invention is oriented perpendicular to the strain field and can be used to detect data which cannot be extracted by state of the art strain gages.

The drawings show transducer 30 applied to a flat planar specimen surface. The transducer can also be applied to a curved specimen surface if desired or necessary.

We wish it to be understood that we do not desire to be limited to the exact details of construction shown and described for obvious modifications will occur to a person skilled in the art, without departing from the spirit and scope of the appended claims.

We claim:

1. Mechanism for nondestructively determining physical properties of a test specimen: said mechanism comprising means (29,31) for generating an ultrasonic wave on the specimen surface, a strain-sensitive transducer (30) adhered to the specimen to be physically deformed by the generated wave, and current supply means (36) electrically connected to the transducer; said transducer comprising at least one elongated conductive-resistive bar (20); said bar having a length dimension extending normal to the general direction of wave travel on the specimen surface, a relatively large transverse width dimension (W) extending parallel to the specimen surface, and a relatively small transverse thickness dimension (T) extending normal to the specimen surface; the width dimension of the bar having extensive area conformance with the surface contour of the test specimen, whereby when the test specimen surface is deformed by the ultrasonic wave the bar undergoes compression-tension strains sufficient to produce measurable changes in the bar resistivity; the width dimension of the bar being no more than about one tenth of the wavelength of the surface wave; the thickness dimension of the bar being appreciably less than the width dimension of the bar.

2. The mechanism of claim 1: said transducer comprising multiple bars (20) arranged in spaced generally parallel relation on the test specimen surface.

3. The mechanism of claim 2: said bars being spaced apart by an integer number of wavelength of the surface wave.

4. The mechanism of claim 3: the bar spacing being one wavelength.

5. The mechanism of claim 4: the width dimension of each bar being approximately one tenth of the surface wave wavelength.

6. The mechanism of claim 1: said wave-generating means comprising a piezo-electric crystal.

7. The mechanism of claim 1: said wave-generating means comprising a prism seated on the test specimen surface with a face thereof angled to the specimen surface, and a piezo-electric crystal adhered to the angled surface of the prism for propagating a wave through the prism onto the specimen surface.

8. The mechanism of claim 1: said transducer being in close proximity to the wave-generating means.

* * * * *